United States Patent [19]
Schmerler et al.

[11] Patent Number: 5,361,331
[45] Date of Patent: Nov. 1, 1994

[54] IMAGE ANALYZER

[75] Inventors: Detlev Schmerler, Gupfenbuhel 513, FL-9493 Mauren, Liechtenstein; Gerhard Brugger, Norliche Hauptstrasse 30, 8183 Rottach-Egern, Germany

[73] Assignees: bbs AG international; Detlev Schmerler, both of Liechtenstein; Gerhard Brugger, Rottach-Egern, Germany

[21] Appl. No.: 746,428

[22] Filed: Aug. 16, 1991

[51] Int. Cl.⁵ ............................................. G06F 15/00
[52] U.S. Cl. ..................................... 395/109; 358/516
[58] Field of Search ................................ 358/515–520, 358/505, 512; 395/109, 101, 131–132; 346/157, 154

[56] References Cited
U.S. PATENT DOCUMENTS

| | | | |
|---|---|---|---|
| 4,926,254 | 5/1990 | Nakatsuka | 358/76 |
| 5,146,323 | 9/1992 | Kobori et al. | 358/76 |
| 5,157,506 | 10/1992 | Hannah | 358/76 |

Primary Examiner—Arthur G. Evans
Attorney, Agent, or Firm—Harry M. Weiss

[57] ABSTRACT

An image analyzer (10) for adjusting a printer comprises a video image converter device (19).

In order to facilitate the adjustment of the color composition of the exposure light emitted by an exposure means (2) of the printer (1), the image analyzer (10) is provided with a means (21) for adapting the spectral sensitivity curve of the video image converter device (19) to that of the photographic material as well as with a white balance control circuit, which is connected to said video image converter device (19) and which is used for producing color component signals for at least two color components of the exposure light emitted by the exposure means (2) of the printer.

7 Claims, 2 Drawing Sheets

IMAGE ANALYZER

BACKGROUND OF THE INVENTION

1. Field of the Invention

The present invention refers to an image analyzer for adjusting a printer, which is used for producing photographic prints, with regard to a colour composition of the exposure light which is to be emitted by an exposure means of said printer and, if necessary, a sharp focus as well as, if necessary, an f-number and/or an exposure time according to the generic clause of patent claim 1.

2. Description of the Related Art

Such an image analyzer, which is known e.g. from the applicant's German patent 35 27 853, includes a video image converter device for recording an original exposed by the exposure means of the printer. The video image converter device is connected to a monitor via a circuit used for adjusting the colour and the brightness of the image converter signal. In the case of negative originals, this colour adjustment circuit comprises a colour reversal circuit. After a calibration of the overall arrangement, which is carried out only once, the known image analyzer permits a reliable determination of the colour composition and, if necessary, of the brightness or of the exposure time of the exposure light which is to be used for a specific negative or positive, said reliable determination being possible on the basis of an adjustment of the colour mixing head of the printer in such a way that the monitor image produced shows the desired colours. However, the respective adjustment will in any case require intervention of an operator as well as an operator's expert eye as far as the judgement of the colours of the monitor image is concerned.

For the purpose of automatically determining the colour value and the brightness of the exposure light used for producing the print in a printer, video analyzers are nowadays used, which determine—without intervention of an operator—the colour value, which is to be used for a specific original, as well as the exposure time of the exposure light. Such video analyzers are also referred to as autoscanners. An autoscanner comprises an exposure device for exposing the original, which will normally be a negative or a transparent original, as well as a scanning device, which can, for example, be a video camera, for recording the original. The scanning device has connected thereto a computer. A specific number of measuring points is examined by the scanning device with regard to brightness and colour values under the control of a computer program. This information is used for deriving therefrom the colour value for the exposure light of the printer as well as the exposure time and the brightness of said exposure light. For carrying out this derivation or calculation, an autoscanner will need a predetermined data set for each type of film. If a negative is underexposed or overexposed or incorrectly developed or incorrectly stored, its mask dyes will, however, change, and this will have the effect that the data set which has once been determined for a specific type of film will no longer be applicable to this type of film. This will also have the effect that the values, which were determined by the known autoscanner and which are used for adjusting the printer when a print is being exposed, are no longer correct. An additional disadvantage of such autoscanners is to be seen in the fact that such apparatuses are systems which are sold at quite a substantial price in the range of more than one hundred thousand German marks so that middle-class photographic firms cannot afford to work with such autoscanners.

SUMMARY OF THE INVENTION

EP-A1-00 54 848 discloses a video analyzer with an integrated printer, said video analyzer including a single exposure device, which consists of a colour mixing head and which is used for analyzing the original as well as for exposing the recording material, and including, in addition, a video camera used for recording the original and connected to a monitor. The video camera, by means of which the original is viewed, has its spectral sensitivity adapted to that of the photographic material used. Control values for the monitor are calculated by means of a colour calculator in such a way that the television picture shown on the monitor will correspond to the copy to be expected. Also this known device includes a computer working with data sets for the individual types of films so that the above-discussed problems in connection with negative mask displacement and in connection with a change in the mask dyes may arise in the case of this known video analyzer as well.

Taking this prior art as a basis, the present invention is based on the task of further developing an image analyzer of the type referred to in the generic clause of patent claim 1 in such a way that the determination of the colour composition of the exposure light, which is to be emitted for a specific original by an exposure means of the printer, will be simplified still further.

In the case of an image analyzer according to the generic clause of patent claim 1, this task is solved by the features disclosed in the characterizing clause of patent claim 1.

The present invention is based on the finding that, after having adapted the spectral sensitivity curve of the video image converter device to the spectral sensitivity curve of the paper used in the printer, it will be possible to adjust the colour value of the light, which has to be emitted by the exposure means of the printer for producing the optimum print, in such a way that displacements of the negative mask and changes in the mask dye caused by incorrect development or incorrect storage of the materials will be compensated for by using a white balance control circuit, of the type provided as a standard component in various video cameras, for the purpose of producing colour component signals for at least two colour components of the exposure light emitted by the exposure means of the printer. In other words, the present invention teaches that the colour distortion of an original can be analyzed by the white balance control circuit of a video camera, which is normally not suitable for this purpose, provided that measures are taken by means of which the spectral sensitivity curve of the video image converter device of the video camera is adapted to the spectral sensitivity curve of the photographic material used in the printer.

According to claim 2, a display device for at least two colour components of the exposure light can be controlled by the white balance control circuit so that the operator can easily recognize the deviation of each of the at least two colour components from a desired value without having to have an expert eye with regard to the judgement of the colours of a monitor image.

In accordance with claim 3, a particularly simple embodiment of the display device is to be seen in the fact that the display device consists of one chain of light-emitting diodes for each of the colour components. Each of said chains of light-emitting diodes can comprise a number of light-emitting diodes of a first colour, which indicate an insufficient or an excessively high percentage of the respective colour component, and it can also include a light-emitting diode of a second colour, which indicates that the correct percentage of the respective colour component has been observed.

According to claim 4, the image analyzer according to the present invention is particularly suitable for use in a printer provided with a colour mixing head with adjustable colour filters, which permit an adjustment of the exposure light of the printer in such a way that the display device of the image analyzer shows the adjustment of a white balance condition.

A fully automatic adjustment of the exposure means of the printer can be carried out by the image analyzer according to the present invention as defined in claim 5 by supplying the colour component signals to a control circuit by means of which adjustment devices having the form of positioning motors or the like and used for at least two colour filters, which form part of the exposure means and which are associated with the colour components, can be adjusted such that the colour component signal for both colour components will assume a white balance condition.

In accordance with a special aspect of the present invention, a high-precision adjustment of the density can be effected according to claim 6 by arranging a diaphragm device or a density adjustment device in the ray path before the video image converter device, said density adjustment device being connected to a timer of the exposure device of the printer.

In accordance with claim 7, a particularly important aspect of the present invention is to be seen in a density measuring probe, which is associated with the image analyzer and which is used for detecting the brightness of the exposure light coming from the exposure means, the output signal of said density measuring probe being adapted to be supplied to a density storage means, when a density storage switch is actuated. By means of such a density measuring probe provided with a storage device which is adapted to be activated, a density value which has been realized as being correct can first be stored—while interposing a diffuser—upon adjusting the printer to the format of the image analyzer, and, after having adjusted the enlarger to the scale of the desired original, the f-number and, consequently, the timer of the exposure means can then be changed, again by use of the diffuser, until the instantaneous value determined by the density measuring probe will correspond to the stored density value. At this value, an optimum exposure will be guaranteed.

BRIEF DESCRIPTION OF THE DRAWINGS

In the following, preferred embodiments of the present invention will be explained in detail with reference to the drawings enclosed, in which.

DESCRIPTION OF THE PREFERRED EMBODIMENTS

Figure 1:
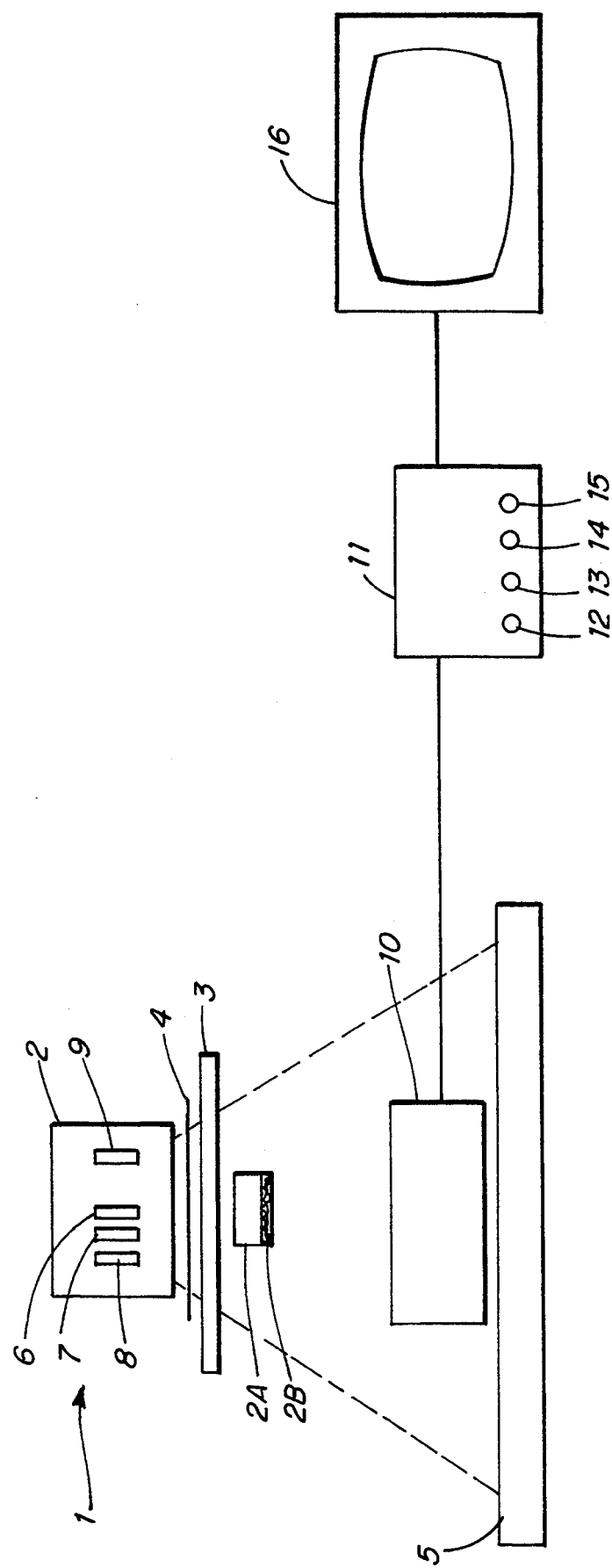
FIG. 1 shows a total view of a printer, which is provided with an image analyzer according to the present invention and which is followed by a monitor.

FIG. 1 shows a printer, which is known per se and which is provided with reference numeral 1 in its entirety, said printer comprising a colour mixing head 2, which serves as an exposure means, an original supporting means 3 arranged in the ray path behind said colour mixing head 2 and used for supporting an original 4, which can be a positive or a negative, as well as a paper supporting means 5.

The colour mixing head 2 comprises colour filter adjustment wheels 6, 7, 8 for adjusting the three colour filters for the three colour components of the exposure light emitted by the colour mixing head 2 as well as a density adjustment wheel 9 for adjusting the light intensity. The light quantity can, of course, also be controlled via a diaphragm 2B at the objective 2A of the colour mixing head. If the f-number exceeds or fails to reach the optimum f-number, it will be possible to change the exposure time via an exposure time setting circuit coupled to a brightness calibration potentiometer 15, which forms part of the circuit 11 and which will be described hereinbelow.

For adjusting the colour composition and, if necessary, the sharpness as well as, if necessary, an f-number or an exposure time of the printer exposure light emitted by the colour mixing head 2, the image analyzer 10 according to the present invention is placed onto the paper supporting means 5. It is also imaginable that the image analyzer according to the present invention is swung into the ray path of the printer 1 by means of a swinging mechanism (not shown) at a given distance from the paper supporting means 5.

As will be explained in detail hereinbelow with reference to the following figures, the image analyzer 10 according to the invention includes a video image converter device 19 for recording the original 4 exposed by the colour mixing head 2.

The video signal provided by the video image converter device, which can be a video camera, is supplied to a circuit 11 used for adjusting the colour and the brightness of said video signal. In the case of a preferred embodiment, this circuit includes a change-over means, which, when actuated, will have the effect that the input signal supplied to the circuit can be converted into a complementary signal with regard to colour as well as with regard to brightness. By actuating colour calibration potentiometers 12, 13, 14 and a brightness calibration potentiometer 15, respectively, this circuit 11 can be used for adjusting the colour value or the brightness value of a monitor image on a monitor 16, which follows said circuit 11 used for adjusting colour and brightness.

A calibration of this circuit 11, which is carried out only once by adequately adjusting the colour calibration potentiometers 12, 13, 14 and the brightness calibration potentiometer 15, respectively, is effected as described hereinbelow: on the basis of a production of test prints of a test negative with grey reference, the optimum adjustment of the colour filter adjustment wheels 6, 7, 8 and of the density adjustment wheel 9 as well as of the diaphragm 2B will first be determined for an arbitrary original 4. The electronic production of a grey reference is controlled by means of the joystick 24. The grey reference of the test negative must correspond to the grey reference produced under the control of the joystick 24. On the basis of this print, which is regarded as being optimal with regard to its colour values and its brightness value, the image of the monitor 16 will be adjusted such that it corresponds to the original with regard to its colour values or its brightness value, said monitor image adjustment being effected by adjusting the colour calibration potentiometers 12, 13, 14 and the brightness adjustment potentiometer 15, respectively. This adjustment will be maintained without any changes for producing future prints of other originals 4.

Figure 2:
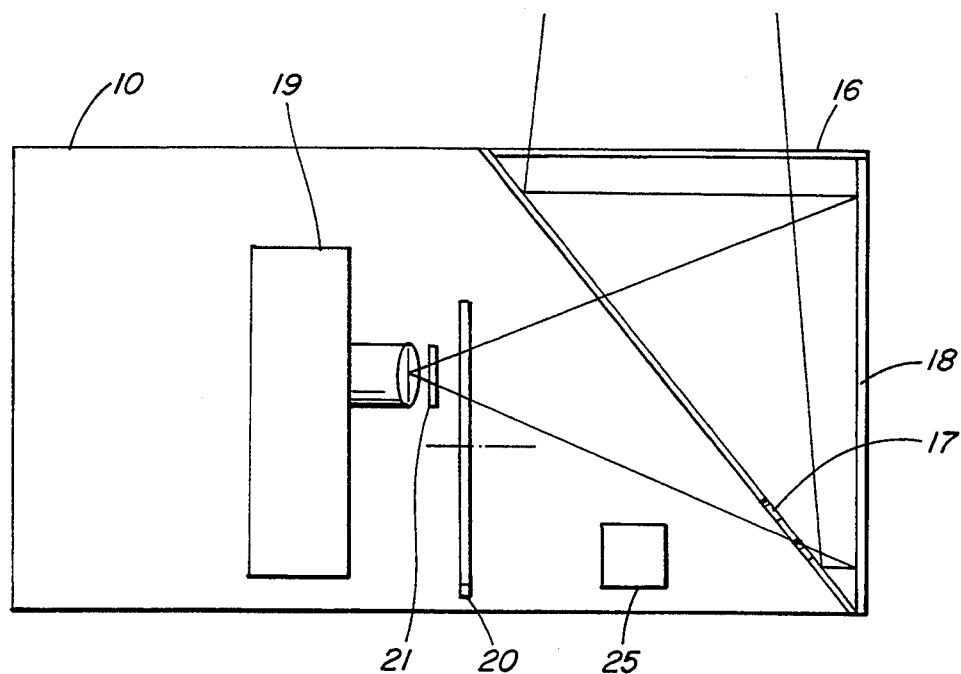
FIG. 2 shows a vertical section through the image analyzer according to the present invention.

In the following, the structural design of the image analyzer according to the present invention as well as the mode of operation of said image analyzer will be explained in detail with reference to FIGS. 2 and 3. As can be seen in the vertical sectional view according to FIG. 2, the image analyzer 10 includes, at the upper side of its housing, a glass plate 16 through which the light emitted by the colour mixing head 2 and passing through the original 4 will enter the image analyzer 10. Within said image analyzer, it will fall onto a semireflecting mirror 17, which is arranged at a 45° angle relative to the horizontal and by means of which the image of the original 4 is deflected onto a reflecting wall 18. The reflecting wall 18 can consist e.g. of a screen or of a mirror.

The image of the exposed original 4 on the screen 18 will be recorded by a video image converter device of a video camera 19, which is arranged within the image analyzer 10. A density adjustment wheel 20 is positioned in the ray path between the objective of the video camera 19 and the reflecting wall 18, the rotational position of said density adjustment wheel 20 corresponding to the density of said density adjustment wheel at the location of the objective of the video camera 19 and being sensed by a rotational angle detection means (not shown). This rotational angle detection means can be a rotary potentiometer. The output signal of this rotary potentiometer is used as an adjustment signal for adjusting the timer for the exposure time. The above-described density adjustment wheel 20 can also be realized by a diaphragm in the objective of the video camera 19.

A spectral filter 21, which is used for adapting the spectral sensitivity curve of the video image converter device of the video camera 19 to that of the photographic material used in the printer, is positioned between the density adjustment wheel 20 and the objective of the video camera 19.

The spectral filter 21 may be arranged at an arbitrary location in the ray path between the colour mixing head and the video camera.

On the basis of this adaptation of the spectral sensitivity curve of the video image converter device of the video camera 19 to the spectral sensitivity curve of the photographic material used, it will be possible to determine, in dependence on the colour distortion of the original and the exposure light used, the correct or the colour-distorted correlation of the colour components of the light behind the original 4 by making use of a white balance control circuit—which is, in principle, normally provided in video cameras—for the purpose of producing colour component signals. This white balance control circuit produces e.g. white balance control signals for two or three colour components, which are normally used in the case of video cameras for automatically establishing a white balance. In accordance with the present invention, these colour component signals are—as will be explained hereinbelow—displayed with the aid of adequate display devices, and, as far as desired, they are also used for automatically adjusting the printer.

Figure 3:
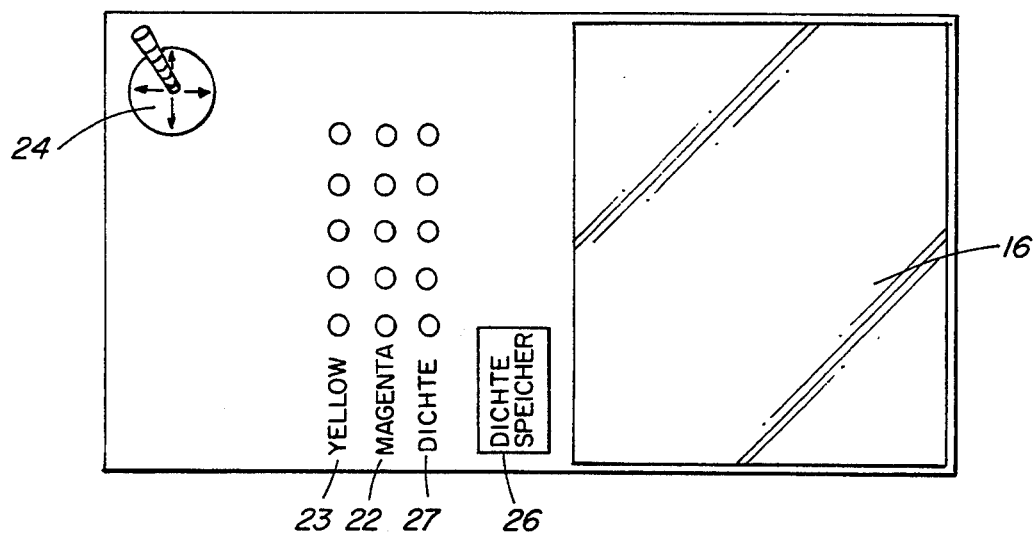
FIG. 3 shows a top view of the image analyzer according to the invention shown in FIG. 2.

As can be seen in FIG. 3, the colour component signals, which are preferably produced for two of the three colour components, can be displayed by means of suitable chains of light-emitting diodes 22 23. Each of said chains of light-emitting diodes 22, 23 for two of the three colour components, which are the colour components magenta and yellow in the case of the present example, comprises one or several light-emitting diodes for an insufficient percentage of these colour components and one or several light-emitting diodes for an excessive percentage of these colour components, a light-emitting diode deviating in colour from these light-emitting diodes being provided for a correct percentage of said colour components.

White balance control circuits in modern video cameras have the property of responding to the respective brightest point within the image detected by them, said brightest point corresponding, in the case of an original, to a black area in said original. Such a dark or black area exists in practically any original. The deviation of this brightest area from the colour white is essentially caused by a displacement of the negative mask occurring e.g. in the case of underexposure or overexposure and in the case of incorrect development or incorrect storage of negatives.

If the chain of light-emitting diodes 22, 23 displays a magenta or a yellow value deviating from the optimum value, the operator will be able to perform adequate re-adjustment of associated colour filters (at 6, at 7, at 8). After having carried out a compensation of the colour filter adjustment by adequate actuation of the colour filters (at 6, at 7, at 8), a final examination of the adjustment result can be effected on the monitor 16.

The density can be controlled either via the density adjustment wheel 9, the diaphragm 2B or the timer (at 15). It is also possible to effect automatic control by means of the automatic iris of a video camera.

Deviating from the embodiment shown, it will also be possible to supply the colour component signals, which are supplied to the two chains of light-emitting diodes 22, 23 in the case of the embodiment shown, directly to a control circuit (not shown) by means of which adjustment devices for at least two colour filters (at 6, at 7, at 8), which are associated with these colour components, and for the density can be adjusted such that the colour component signal for the two colour components will assume a white balance condition. In this case, it will no longer be necessary that an operator manually re-adjusts the colour values of the exposure light, which is emitted by the colour mixing head 2, in accordance with the display effected by the display device 22, 23.

In accordance with a special aspect of the present invention, the image analyzer 10 has provided therein a density measuring probe 25, which is arranged below the semi-reflecting mirror 17 and the output value of which is read into a density storage means (not shown) in response to actuation of a density storage switch 26. The deviation of the density value measured instantaneously by the density measuring probe 25 from the stored density value is displayed on a separate chain of light-emitting diodes 27 associated with density.

For optimizing the density adjustment, the following course of action is taken in accordance with the present invention:

first of all the enlarger is—e.g. by lowering the head portion of said enlarger—adapted to the detection area of the image analyzer 10 in the format of the original imaged, said detection area corresponding essentially to the size of the glass plate 16. With the negative inserted, a diffuser (not shown) is swung into the ray path between the colour mixing head 2 and the image analyzer 10, and, in this condition, the switch 26 for activating the density storage means is actuated. After having removed the diffuser from the ray path, the enlarger is—e.g. by raising its head portion—adjusted such that the image of the original on the paper supporting means 5 has the desired size. A focussing adjustment of the enlarger 1 will be effected by viewing the monitor image on the monitor 16.

After renewed swinging in of the diffuser, the brightness value of the exposure light will—e.g. by adjusting the diaphragm adjustment wheel 9 at the colour mixing head 2—be adjusted until it can be seem from the display on the chain of light-emitting diodes 27 associated with density that the instantaneous value measured by the density measuring probe 25 corresponds to the stored value.

In order to avoid exceeding the control range of the above-mentioned diaphragm at the colour mixing head 2, the density measuring probe 25 may additionally be operatively connected to the timer of the colour mixing head 2 in such a way that the exposure time will be changed, when the diaphragm is fully opened or closed. This change will arithmetically be taken into account upon comparing the stored measured value of density with the instantaneously measured value of density. The adaptations, which have just been described with reference to the adjustment of the diaphragm of the colour mixing head, can thus also be effected via the timer.

By means of the image analyzer according to the present invention it will be possible to carry out an adjustment of the colour mixing head, in the case of which re-adjustment is effected manually by an operator, or a controlled adjustment of the colour mixing head without any intervention on the part of the operator, mask displacements or emulsion displacements of the negative mask, which may perhaps occur, being then automatically compensated for. In contrast to known autoscanners, the image analyzer according to the present invention requires neither a computer for calculating the colour component values nor data sets concerning the types of films used, said data sets being also referred to as film channels.

On the basis of the image analyzer according to the present invention, it will be possible to remodel—by means of minor technical and financial expenditure—existing printers into printer systems whose qualitative efficiency exceeds that of computer-controlled autoscanners according to the prior art.

We claim:

1. An image analyzer (10) for adjusting a printer (1), which is used for producing photographic prints, with regard to a colour composition of the exposure light which is to be emitted by an exposure means (2) of said printer (1) and, if necessary, a sharp focus as well as, if necessary, an f-number and/or an exposure time, comprising
    a video image converter device (19) for recording an original (4) exposed by the exposure means (2) of the printer (1),
    a means (21) for adapting the spectral sensitivity curve of the video image converter device (19) to the spectral sensitivity curve of the photographic material used in said printer (1), and
    a white balance control circuit, which is connected to said video image converter device (19) and which is used for producing colour component signals for at least two colour components of the exposure light emitted by the exposure means (2) of said printer (1),
    wherein the colour component signals are supplied to a control circuit by means of which adjustment devices for at least two colour filters (at 6, at 7 at 8), which are associated with the colour components, can be adjusted such that the colour component signal for both colour components will assume a white balance condition.

2. An image analyzer according to claim 1, characterized by a display device (22, 23) for at least two colour components of the exposure light, said display device being controlled by the white balance control circuit.

3. An image analyzer according to claim 2, characterized in that the display device consists of one chain of light-emitting diodes (22, 23) for each of the colour components.

4. An image analyzer according to claim 3, characterized in that the setting device is provided with a dual-operated potentiometer constructed as a socalled joystick (24).

5. An image analyzer according to one of the claims 1 to 4, characterized by
    a diaphragm device arranged in the ray path before the video image converter device (19) or
    a density adjustment device (20) connected to a timer of the exposure device (2) of the printer (1).

6. An image analyzer according to claim 5, characterized by a density measuring probe (25), which is arranged within said image analyzer and which is used for detecting the brightness of the exposure light coming from the exposure means (2), the output signal of said density measuring probe being adapted to be supplied to a density storage means, when a density storage switch (26) is actuated.

7. A method of providing an image analyzer (10) for adjusting a printer (1), which is used for producing photographic prints, with regard to a colour composition of the exposure light which is to be emitted by an exposure means (2) of said printer (1) and, if necessary, a sharp focus as well as, if necessary, an f-number and/or an exposure time, comprising
    providing a video image converter device (19) for recording an original (4) exposed by the exposure means (2) of the printer (1),
    characterized by
    providing a spectral filter means (21) arranged in the light path to the video image converter device for adapting the spectral sensitivity curve of the video image converter device (19) to the spectral sensitivity curve of the photographic material used in said printer (1), and
    providing a white balance control circuit, which is connected to said video image converter device (19) and which is used for producing colour component signals for at least two colour components of the exposure light emitted by the exposure means (2) of said printer (1).

* * * * *